United States Patent [19]
Chang

[11] 4,245,882
[45] Jan. 20, 1981

[54] DOUBLY MODULATED ON-AXIS THICK HOLOGRAM OPTICAL ELEMENT

[75] Inventor: Byung J. Chang, Ann Arbor, Mich.

[73] Assignee: Environmental Research Institute of Michigan, Ann Arbor, Mich.

[21] Appl. No.: 848,611

[22] Filed: Nov. 4, 1977

[51] Int. Cl.³ .......................... G02B 5/32; G03H 1/28
[52] U.S. Cl. ................................... 350/3.72; 350/3.77
[58] Field of Search .................... 350/3.72, 3.70, 3.71, 350/3.73, 3.77

[56] References Cited

U.S. PATENT DOCUMENTS

| | | | |
|---|---|---|---|
| 3,666,345 | 5/1972 | Maslowski | 350/3.7 |
| 4,094,577 | 6/1978 | Spitz et al. | 350/3.72 |

OTHER PUBLICATIONS

Katyl, *Applied Optics*, vol. 11, No. 5, May 1972, pp. 1241–1247.
Alferness et al., *Jour. of the Optical Society of America*, vol. 65, No. 6, Jun. 1975, pp. 730–739.

*Primary Examiner*—Ronald J. Stern
*Attorney, Agent, or Firm*—Krass & Young

[57] ABSTRACT

An on-axis thick phase holographic optical element for use as a lens is fabricated by incorporating two off-axis holograms of two point sources located on opposite sides of the plate made by use of reference beams having a common angle with respect to the photographic media and complementary curvatures in the two cases. The element may be formed either by forming the two holograms in a single photographic emulsion, incoherently relative to one another, using a double exposure technique, or by forming the holograms on two physically separated media and then joining them to one another with their emulsion sides in contact. The resultant elements enjoy the low dispersion and aberrations like a conventional on-axis thin holographic optical element and the high diffraction efficiency like a thick hologram and additionally provide an extremely high ratio of diffracted to undiffracted light energy in the on-axis image.

6 Claims, 10 Drawing Figures

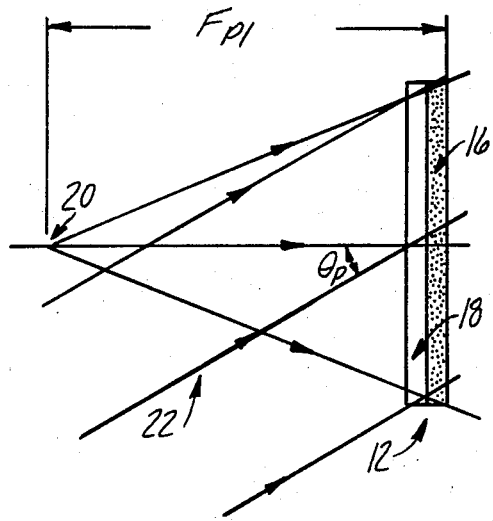
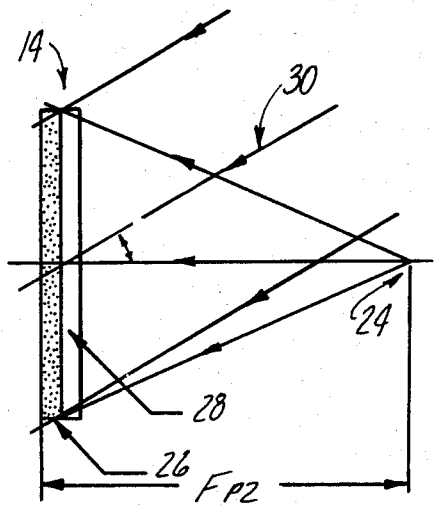
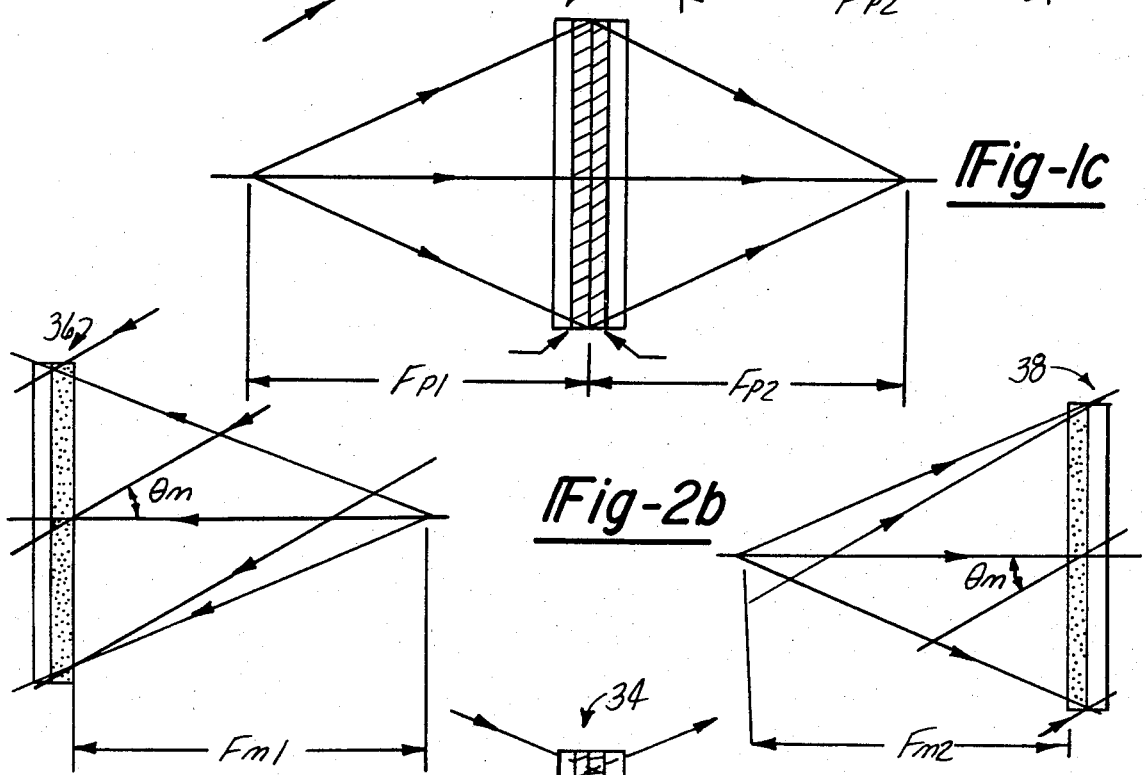
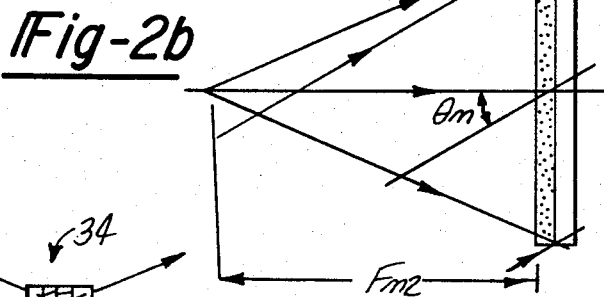
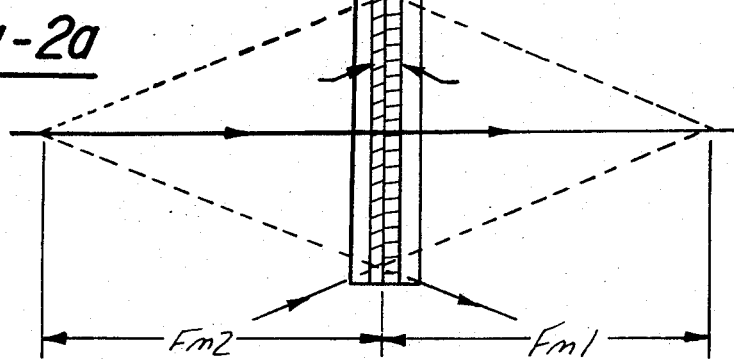

DOUBLY MODULATED ON-AXIS THICK HOLOGRAM OPTICAL ELEMENT

BACKGROUND OF THE INVENTION

1. Field of the Invention

This invention relates to planar optical diffraction elements for use as lenses or the like, and to a method of making the elements employing thick holographic techniques.

2. Prior Art

Planar optical elements incorporating diffraction patterns are useful as lenses, for performing Fourier transformation and spatial filtering in coherent optical processing apparatus, imaging and various like purposes. They are commonly formed by holographic methods involving the coherent recordation (on a photographic media) of the interference pattern between a wavefront emanating from a light source, and a coherently generated reference wavefront.

In the past, two main techniques have been available for forming these holographic optical elements (HOE). One method employed object and reference wavefronts arrayed on-axis relative to the optical element to produce a thin two-dimensional fringe pattern in the plane of the optical element and the other used a reference beam off-axis relative to the object beam to produce a holographic record through the thickness of the photographic media. The on-axis HOE provides a low dispersion and minimal optical aberrations when compared to the off-axis thick HOE's. On the other hand the thick HOE's provide a relatively high ratio of diffracted to undiffracted light. In the past, either a thick or thin HOE has been chosen, depending upon the nature of its intended use.

The present invention is broadly directed toward a unique form of diffraction optical element which combines the most advantageous characteristics of conventional thin and thick HOE's and provides a better ratio of diffracted light energy to undiffracted light energy in the on-axis image than either of these prior art elements. The invention also relates to a method of forming this unique HOE.

SUMMARY OF THE INVENTION

The holographic optical elements of the present invention broadly comprise planar lens-like optical elements having two grating patterns recorded therein. The grating patterns are formed through the thickness of the media and may be formed on a single media or on two separate medias which are joined together into a single unitary structure. The two patterns both operate upon an incident wavefront, either simultaneously or sequentially, depending upon the nature of the element, and provide equal and opposite aberrations which largely cancel one another to produce a low overall aberration.

The dispersions produced by the two patterns are also equal and in opposite directions and result in a very low net dispersion.

The holographic optical elements of the present invention can be formed in a single photographic emulsion or in two separate photographic emulsions which are then joined together to form a unitary structure. In the case of the use of the single photographic emulsion two thick holograms of two point sources disposed on opposite sides of a photographic media are formed sequentially employing a double exposure technique. The reference beams employed with the two exposures must make the same angle with respect to the photographic media in both cases and have complementary curvatures, i.e., two plane waves may be employed for the two reference beams or one wave may be concave and the other wave convex in a complementary manner. The light wavefronts used to produce the two holograms are incoherent relative to one another. The diffraction mechanism of such HOE's formed in a single layer is the cross-coupling of the incoherently added thick holograms.

The resultant holographic optical element (which will be termed a simple DOMOTHOE, from doubly modulated thick optical element) can act as either a positive or a negative optical element, i.e., it will either condense or disperse an incident wavefront depending upon the angle of incidence of the wavefront with respect to the element.

The other method of forming holographic optical elements of the present invention involves the formation of two separate off-axis holograms of point sources on separate photographic media. The reference beams employed in the formation of the two holograms must have the same angle relative to the photographic media and have complementary curvatures; preferably, both are plane waves. In the formation of these two holograms the object and reference beams have the same attitude with respect to the photographic media in both cases; they are both incident either upon the emulsion side or upon the backing side of the photographic media. After development, the emulsion sides of the two holograms are joined into intimate contact with one another to form a unitary structure.

The diffraction mechanism of this complex optical element (which will be termed a complex DOMOTHOE), is sequential modulation. Each modulation adds aberrations and dispersions, but the aberrations and dispersions are equal and opposite and result in relatively low aberration and dispersion.

The complex holographic optical elements of the present invention can be constructed in either positive or negative form. The positive form may be achieved by employing object and reference beams in the formation of the two separate holograms which are incident upon the backing side of the photographic media. When the emulsion sides are joined together to form the unitary structure the combined structure acts like a condensing lens. Alternatively, if both the object and reference wavefronts are incident upon the emulsion side of the photographic media during the formation of the two holograms a negative element having the characteristics of a double concave lens will result from the composite structure.

The focal power of the devices of the present invention are functions of the focal length of the two individual holograms which form the device. These focal lengths can be selected to minimize aberrations in a given application.

Optical elements formed in accordance with the present invention have been found to be extremely useful and efficient for imaging purposes, Fourier transformation and spatial filters.

Other objectives, advantages and applications of the present invention will be made apparent by the following detailed description of several preferred embodiments of the invention. The description makes reference to the accompanying drawings in which:

FIG. 1a is a schematic diagram illustrating the manner of formation of one of the two holograms used to fabricate a positive complex DOMOTHOE;

FIG. 1b is a schematic diagram of the method employed to form the other hologram forming part of the positive complex DOMOTHOE;

FIG. 1c is a schematic diagram illustrating the nature and mode of operation of the resulting positive complex DOMOTHOE;

FIG. 2a is a schematic diagram illustrating the method of forming one of the two holograms employed in the fabrication of a negative complex DOMOTHOE;

FIG. 2b is a schematic diagram illustrating the method of formation of the other hologram employed to fabricate a negative complex DOMOTHOE;

FIG. 2c is a schematic diagram illustrating the nature and mode of operation of the resulting fabricated negative complex DOMOTHOE;

Figure 3A:
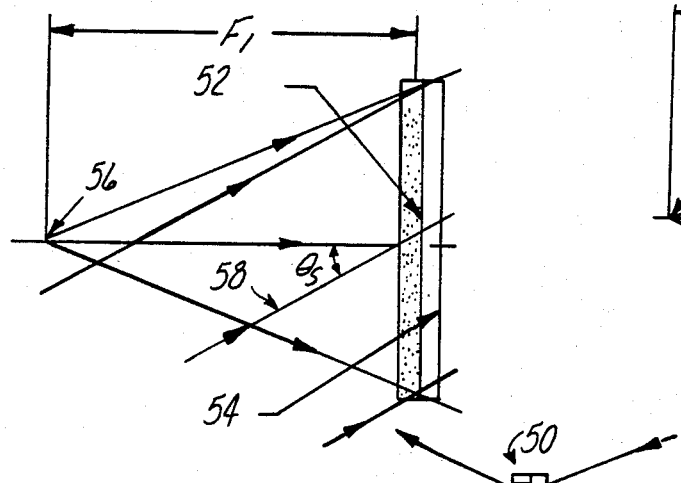
FIG. 3a is a schematic diagram illustrating the first step in the formation of a simple DOMOTHOE.

Referring to the drawings, the fabrication of a complex DOMOTHOE, generally indicated at 10 in FIG. 1, involves the initial formation of two holograms 12 and 14 and their assembly into a unitary structure by joining the emulsion sides of the two individual holograms to one another as by cementing or clamping to form the single structure 10.

The complex DOMOTHOE illustrated in FIG. 1 has its diffraction patterns arranged to act as a positive optical element. The negative element, and its method of formation, are illustrated in FIGS. 2a, 2b and 2c.

The hologram 12 forming one-half of the complex DOMOTHOE structure is formed using an exposure step schematically diagrammed in FIG. 1a. A photographic plate consisting of a thick emulsion coating 16 formed on a transparent support element 18 is used in the formation of the hologram. The photographic media may be of the type conventionally employed to form thick holograms. Plate 18 may be a rigid glass structure or flexible film structure.

The photographic media is exposed to light from a point source 20 located along the central axis of the photographic media on the support plate side. The distance of the point source 20 from the emulsion coating side 16 will be termed $F_{p1}$. The photographic media is also illuminated by a reference beam 22 of off-axis light coherent with light from the point source 20, both beams being preferably derived from a common laser source employing a beam splitting technique. The reference beam 22 is planar in the preferred embodiment of the invention and makes an angle $\theta_p$ with respect to the central axis of the photographic plate. This hologram is subsequently developed in a conventional manner to form the holographic element 12.

The second hologram 14 is recorded by using a point source 24 located on the central axis of a photographic plate having an emulsion side 26 and a backing side 28. Like the point source 20, the point 24 is located on the backing side of the photographic plate and is displaced at distance $F_{p2}$ which may be the same or different than $F_{p1}$. The reference beam 30 employed in the formation of the second hologram makes an equal and opposite angle $\theta_p$ with the central axis and is also a plane wave. If the reference beam 22 had some curvature with respect to the photographic plate it would be necessary for the reference beam 30 to have a complementary curvature.

After the two resulting plates are developed using conventional hologram processing techniques suitable for holography to form the plates 12 and 14, the plates are cemented together or otherwise fixed together with their emulsion sides in contact to one another to form a structure 10. The structure 10 will act as a positive holographic element and a point source located at $F_{p1}$ will be focused at $F_{p2}$ and vice versa.

FIGS. 2a, b and c illustrate the processes for forming a negative complex DOMOTHOE generally indicated at 34 by forming two holograms 36 and 38 and joining them with their emulsion sides in contact with one another. The steps employed in recording the two holograms are illustrated in FIGS. 2a and 2b and are substantially identical to the processes used to form the two holograms making up the positive complex DOMOTHOE, as illustrated in FIGS. 1 and 2, except that the object and reference beams are incident upon the emulsion side of the photographic media rather than the support side. The resulting DOMOTHOE 34 will act as a negative optical element or as a double concave lens. FIG. 2c illustrates the optical performance of the negative complex DOMOTHOE 34.

Figure 3B:
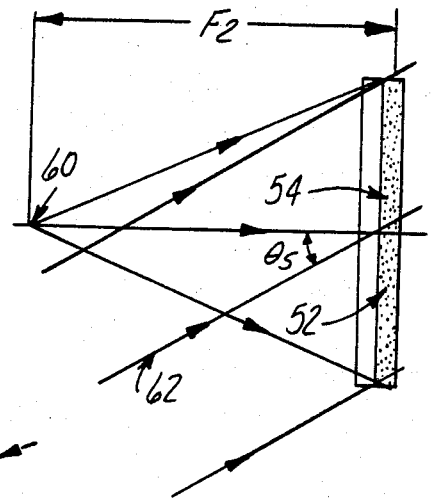
FIG. 3b is a schematic diagram of the second step involved in the formation of a simple DOMOTHOE.
Figure 3C:
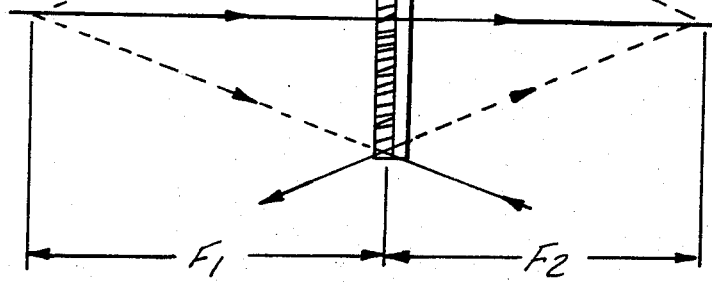
FIG. 3c is a schematic diagram of the nature and mode of operation of the resulting simple DOMOTHOE.

A simple DOMOTHOE, generally indicated at 50, which can be employed as either a positive or negative optical element is formed by the incoherent, double exposure, addition of two hologram recording steps as illustrated in FIGS. 3a and 3b. The first hologram is formed by exposing a photographic media consisting of an emulsion side 52 on a transparent backing side 54 with coherent beams from an on-axis point source 56 and a reference beam 58. The reference beam 58 is preferably planar and makes an angle $\theta_s$ with respect to the central axis. During one of the steps the point source is located on the emulsion side of the photographic plate at focal distance $F_1$. In the second step the photographic plate, before development, is exposed to a light beam from a point source 60 located at a distance $F_2$, on the backing side 54 of the photographic media. The reference beam employed in the second exposure 62, makes an equal and opposite angle $\theta_s$ with respect to the media and has a plane wavefront or a curvature complementary to the curvature of the reference beam 58.

As illustrated in FIG. 3a the resulting element can act as either a positive or a negative element, like a double convex or double concave lens.

Figure 4:
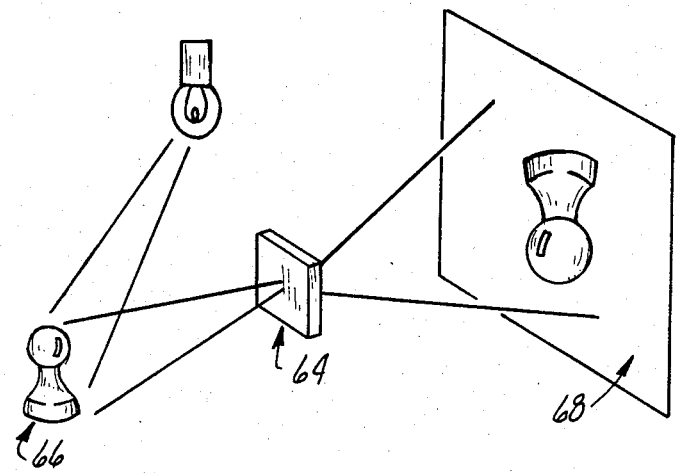
FIG. 4 is an illustration of the manner of use of any of the DOMOTHOE's of the present invention as a lens.

FIG. 4 illustrates the use of a positive DOMOTHOE 64, produced by the method of the present invention, as either a complex or simple structure, to focus an image of an object 66 a screen 68. The optical element of the present invention can also be used as coherent processing elements.

The embodiments of the invention in which an exclusive property or privilege is claimed are defined as follows:

1. A holographic optical element comprising a planar element incorporating thick phase holograms of two point sources disposed on opposite sides of the element, the holograms being formed incoherently with respect to each other using off-axis reference beams having complementary curvatures and making equal and opposite angles with respect to the optical axis of the element.

2. The holographic optical element of claim 1 wherein the two reference waves are each plane waves.

3. The holographic optical element of claim 1 wherein both holograms are formed in a single holographic recording medium by sequential double exposure.

4. The holographic optical element of claim 1 wherein the two holograms are formed on separate holographic plates, each plate consisting of a holographic emulsion coated on a transparent support section, and wherein the plates are disposed with their emulsion sides in intimate contact with one another in the optical element.

5. The holographic optical element of claim 4 wherein the object and reference beams used in the formation of the two holograms intersect the holographic plate from the transparent support section side to form a positive element.

6. A holographic optical element of claim 4 wherein the object and reference beams used in the formation of the holograms intersect in the holographic plate on the emulsion side to form a negative optical element.

* * * * *

UNITED STATES PATENT AND TRADEMARK OFFICE
CERTIFICATE OF CORRECTION

PATENT NO. : 4,245,882

DATED : January 20, 1981

INVENTOR(S) : BYUNG J. CHANG

It is certified that error appears in the above-identified patent and that said Letters Patent are hereby corrected as shown below:

In the Abstract, line 1, after "element" insert --(HOE)--.

Column 1, line 66, after "two" (first occurrence) insert --off-axis--.

Column 3, line 29, delete "FIGURE 1" and insert --FIGURE 1c--.

Column 4, line 56, after "66" insert --on--.

Signed and Sealed this

Second Day of June 1981

[SEAL]

Attest:

RENE D. TEGTMEYER

*Attesting Officer*   *Acting Commissioner of Patents and Trademarks*